US012620367B2

(12) United States Patent
Zaozerskii et al.

(10) Patent No.: US 12,620,367 B2
(45) Date of Patent: *May 5, 2026

(54) CIRCUIT DEVICE AND DISPLAY SYSTEM

(71) Applicant: SEIKO EPSON CORPORATION, Tokyo (JP)

(72) Inventors: Stanislav Zaozerskii, Richmond (CA); Sebdani mahmood Mazrouei, Markham (CA); Kumar anandabairavasamy Anand, Richmond (CA)

(73) Assignee: SEIKO EPSON CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,581

(22) Filed: Nov. 27, 2024

(65) Prior Publication Data

US 2025/0174204 A1 May 29, 2025

(30) Foreign Application Priority Data

Nov. 28, 2023 (JP) ................................ 2023-200471

(51) Int. Cl.
*G09G 3/34* (2006.01)

(52) U.S. Cl.
CPC ......... *G09G 3/3413* (2013.01); *G09G 3/3426* (2013.01); *G09G 2320/0242* (2013.01); (Continued)

(58) Field of Classification Search
CPC ............... G09G 3/3413; G09G 3/3426; G09G 2320/0242; G09G 2320/0285; G09G 2320/0646; G09G 2360/16
See application file for complete search history.

(56) References Cited

U.S. PATENT DOCUMENTS 8,390,656 B2 3/2013 Muroi et al.
8,605,017 B2 12/2013 Brown Elliott et al.
(Continued)

FOREIGN PATENT DOCUMENTS

JP 2019-095559 A 6/2019
JP 2021-009170 A 1/2021
JP 2024-009483 A 1/2024

*Primary Examiner* — Antonio Xavier

(74) *Attorney, Agent, or Firm* — Harness, Dickey & Pierce, P.L.C.

(57) ABSTRACT

A circuit device includes a luminance processing circuit and a color correction circuit. The luminance processing circuit computes lighting luminance information indicating luminance at which a target pixel of a display panel is illuminated by a plurality of light source elements, based on light source luminance information indicating luminance of light emitted by each of the plurality of light source elements and attenuation rate distribution information indicating an attenuation rate distribution of light with respect to a distance between each of the light source elements and each of pixels. The color correction circuit performs color correction on input image data based on the lighting luminance information. The luminance processing circuit computes the lighting luminance information by disabling light source luminance information of virtual light source positions where the plurality of light source elements are not arranged in a computing grid used for computation of the lighting luminance information.

11 Claims, 10 Drawing Sheets

(52) U.S. Cl.
CPC ............... *G09G 2320/0285* (2013.01); *G09G 2320/0646* (2013.01); *G09G 2360/16* (2013.01)

(56) References Cited

U.S. PATENT DOCUMENTS

| | | | | |
|---|---|---|---|---|
| 8,670,006 | B2 | 3/2014 | Hong et al. | |
| 8,982,038 | B2 | 3/2015 | Higgins et al. | |
| 9,240,144 | B2 | 1/2016 | Cho et al. | |
| 9,390,660 | B2 | 7/2016 | Johnson et al. | |
| 11,475,865 | B2 | 10/2022 | Chappalli | |
| 2009/0174638 | A1* | 7/2009 | Brown Elliott ...... | G09G 3/2081 345/88 |
| 2011/0273495 | A1 | 11/2011 | Ward et al. | |
| 2020/0160813 | A1* | 5/2020 | Aurongzeb .............. | G09G 3/36 |
| 2021/0311361 | A1* | 10/2021 | Okamoto ................. | G09G 5/10 |
| 2022/0319402 | A1* | 10/2022 | Furukawa ................ | G09G 3/32 |
| 2024/0013739 | A1 | 1/2024 | Akiba et al. | |

* cited by examiner

CIRCUIT DEVICE AND DISPLAY SYSTEM

The present application is based on, and claims priority from JP Application Serial Number 2023-200471, filed Nov. 28, 2023, the disclosure of which is hereby incorporated by reference herein in its entirety.

BACKGROUND

1. Technical Field

The present disclosure relates to a circuit device, a display system, and the like.

2. Related Art

JP-A-2019-095559 discloses an image display device that performs local dimming. LEDs of a backlight are arranged in a matrix. The image display device includes an LED output value calculation unit, a display luminance calculation unit, and an LCD data calculation unit. The LED output value calculation unit calculates light-emission luminance data indicating luminance at the time of light emission of a light source corresponding to each area of an image. The display luminance calculation unit performs convolution processing on the light-emission luminance data using a point spread function or a luminance spread function to calculate spread luminance data. A linear interpolation unit performs linear interpolation processing on the spread luminance data to obtain display luminance data for each pixel. The LCD data calculation unit calculates a light transmittance of each pixel for each primary color based on the input image data and the display luminance data.

In the local dimming, there is a problem in that luminance of the backlight can be calculated only when the light source elements of the backlight are arranged in a specific arrangement that is assumed in advance. In JP-A-2019-095559 described above, for example, it is assumed that LEDs of the backlight are arranged in a matrix form, and luminance calculation of the backlight in a case where the LEDs are arranged in a form other than the matrix form is not assumed.

SUMMARY

As aspect of the present disclosure relates to a circuit device that controls a display device including a plurality of light source elements and a display panel, the circuit device including: a luminance processing circuit that computes lighting luminance information indicating luminance at which a target pixel of the display panel is illuminated by the plurality of light source elements, based on light source luminance information indicating luminance of light emitted by each of the plurality of light source elements and attenuation rate distribution information indicating an attenuation rate distribution of light with respect to a distance between each of the light source elements and each of pixels; and a color correction circuit that performs color correction on input image data based on the lighting luminance information, the luminance processing circuit being configured to compute the lighting luminance information by disabling the light source luminance information of virtual light source positions where the plurality of light source elements are not arranged in a computing grid used for computation of the lighting luminance information.

Another aspect of the present disclosure relates to a display system including the circuit device described above and the display device.

DESCRIPTION OF EMBODIMENTS

Hereinafter, a preferred embodiment of the present disclosure will be described in detail. It should be noted that the present embodiment described below is not intended to unduly limit the content described in the scope of claims, and all components described in the present embodiment are not necessarily essential requirements.

1. Electronic Apparatus, Display System, and Circuit Device

Figure 1:
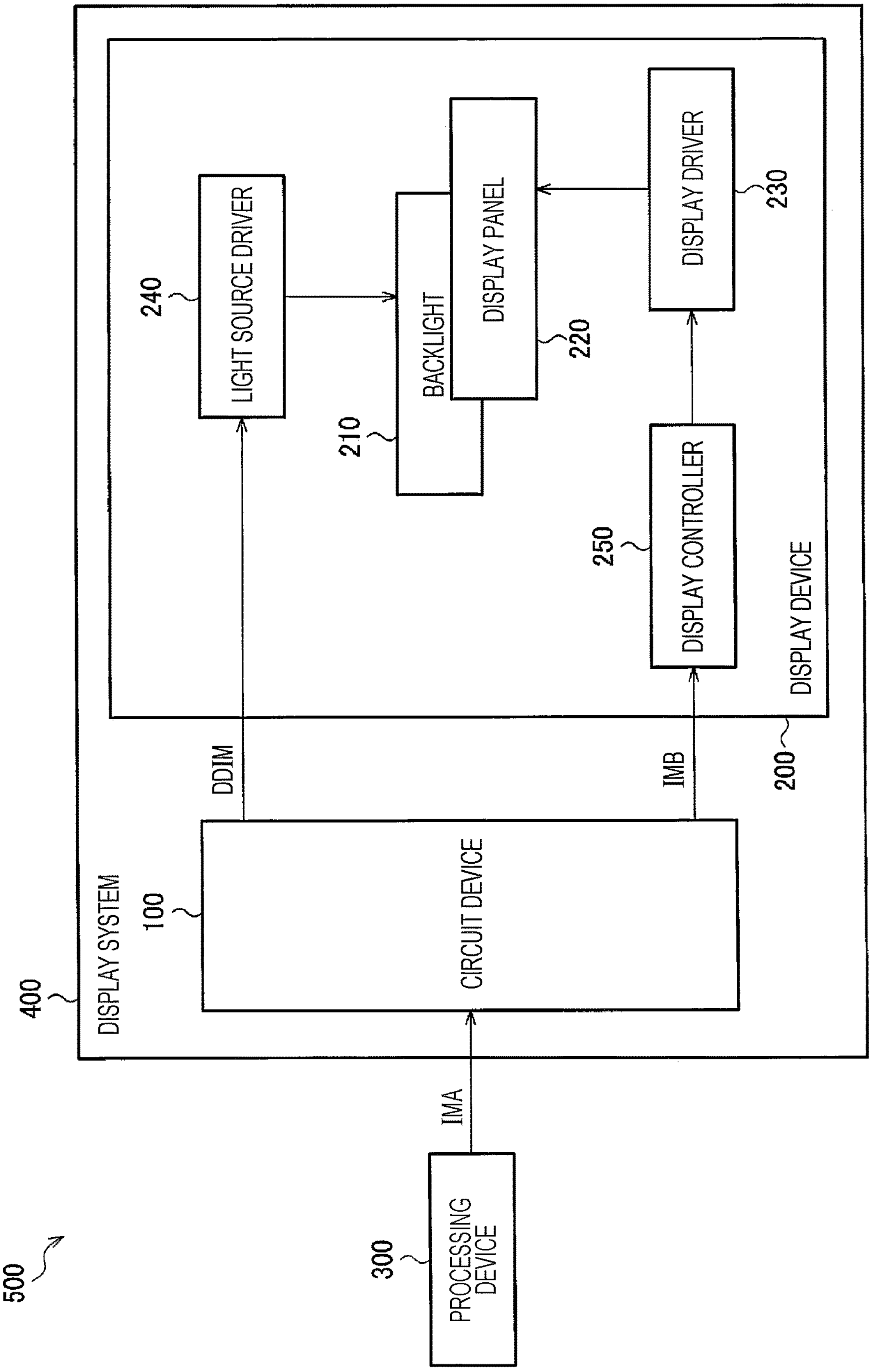
FIG. 1 is a diagram illustrating an example of a configuration of an electronic apparatus.

FIG. 1 illustrates an example of a configuration of an electronic apparatus including a display system of the present embodiment. An electronic apparatus 500 includes a processing device 300 and a display system 400. An example of the electronic apparatus 500 may be an in-vehicle display apparatus including an instrument panel, a center information display, a head-up display, or an electronic mirror, a television apparatus, or an information processing apparatus including a display.

The display system 400 includes a circuit device 100 and a display device 200. The circuit device 100 is, for example, an integrated circuit device in which circuit elements are integrated on a semiconductor substrate. Although the circuit device 100 and the display device 200 are illustrated as separate components in FIG. 1, the circuit device 100 may be provided in the display device 200.

The display device 200 includes a backlight 210, a display panel 220, a display driver 230, a light source driver 240, and a display controller 250. An example of the display device 200 is a display used for a television apparatus, an information processing apparatus, or the like. Alternatively, the display device 200 may be, for example, a head-mounted display including a projection device for eyes, or a head-up display including a projection device for a screen. When the display device 200 is a head-up display, the display device 200 further includes an optical system for projecting, onto a screen, light emitted from the backlight 210 and transmitted through the display panel 220.

In plan view of the backlight 210, light source elements are two-dimensionally arranged in the backlight 210. The light source elements are light-emitting elements that emit light by power supply, and are, for example, inorganic light-emitting diodes or organic light-emitting diodes. In local dimming control, the amounts of light of the two-dimensionally arranged light source elements are controlled independently of each other. Alternatively, the backlight 210 may be divided into areas. In plan view, light source elements are arranged in each of the areas. The light source elements arranged in an area are controlled to have the same amount of light, and the amounts of light of the respective areas are controlled independently of each other.

An example of the two dimensional arrangement of the light source elements is a matrix arrangement in which the light source elements are arranged at all intersections of a plurality of rows and a plurality of columns. However, the two dimensional arrangement is not limited to the matrix arrangement. For example, the two-dimensional arrangement may be an arrangement called, for example, a rhomboid arrangement or a zigzag arrangement. In this arrangement, the light source elements are arranged at the intersections of the odd-numbered columns and either of the odd-numbered rows or the even-numbered rows, and at the intersections of the even-numbered columns and the other of the odd-numbered rows and the even-numbered rows, and the light source elements are not arranged at the other intersections. For the computation in the circuit device 100, a computing grid corresponding to the matrix arrangement is used. The light source positions in the computing grid may mixedly include positions at which light source elements are actually arranged and positions at which no light source element is arranged. In this regard, it will be described in detail below.

The light source driver 240 receives light source luminance data DDIM from the circuit device 100 and drives each of the light source elements of the backlight 210 based on the light source luminance data DDIM. The light source driver 240 is, for example, an integrated circuit device. Two or more light source drivers may be provided, and each of the light source drivers may be a separate integrated circuit device.

The display panel 220 is an electro-optical panel through which light from the backlight 210 is transmitted and which displays an image by controlling of a transmittance thereof. For example, the display panel 220 is a liquid crystal display panel.

The display controller 250 receives image data IMB from the circuit device 100 and transmits the image data IMB and a timing control signal for controlling a display timing to the display driver 230. The display controller 250 may perform image processing such as gradation correction, white balance correction, or scaling on the received image data IMB.

The display driver 230 drives the display panel based on the received image data IMB and timing control signal, thereby causing the display panel 220 to display an image. The display controller 250 and the display driver 230 may be configured by separate integrated circuit devices, or may be configured by a single integrated circuit device.

The processing device 300 transmits image data IMA to the circuit device 100. The processing device 300 is a processor such as a CPU, a GPU, a microcomputer, a DSP, an ASIC, or an FPGA. CPU is an abbreviation for Central Processing Unit. GPU is an abbreviation for Graphics Processing Unit. DSP is an abbreviation for Digital Signal Processor. ASIC is an abbreviation for Application Specific Integrated Circuit. FPGA is an abbreviation for Field Programmable Gate Array.

The circuit device 100 receives the image data IMA and performs local dimming control of the display device 200 based on the image data IMA. The circuit device 100 performs dimming on light-emission luminance of each light source element of the backlight 210 or each area of the backlight 210 according to luminance of the image data IMA and outputs light source luminance information, which is obtained by the dimming, to the light source driver 240 as light source luminance data DDIM. The circuit device 100 performs color correction on the image data IMA based on the light source luminance information and outputs the image data IMB after the color correction to the display controller 250.

Figure 2:
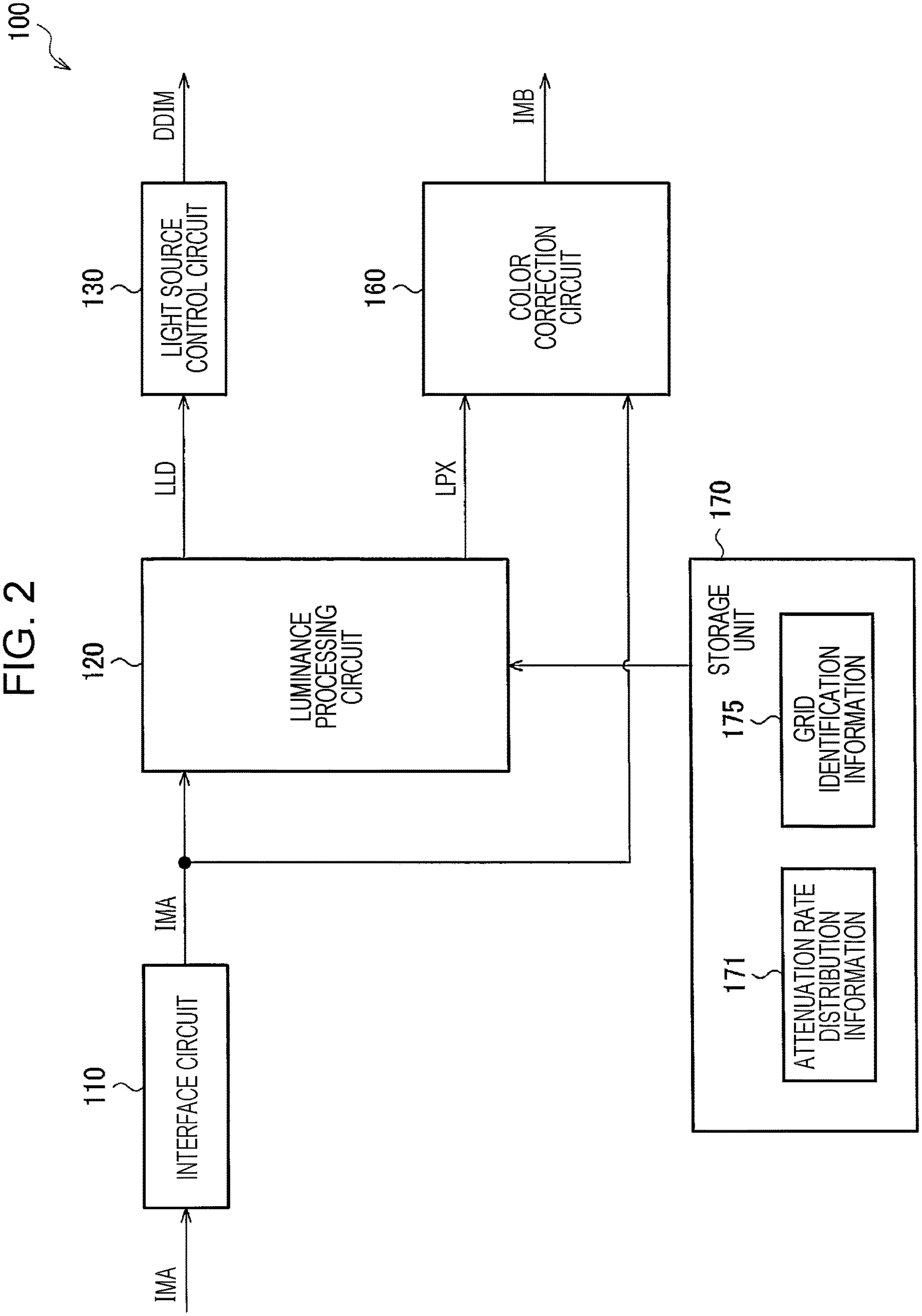
FIG. 2 is a diagram illustrating an example of a configuration of a circuit device.

FIG. 2 illustrates an example of a configuration of the circuit device. The circuit device 100 includes an interface circuit 110, a luminance processing circuit 120, a light source control circuit 130, a color correction circuit 160, and a storage unit 170.

The interface circuit 110 receives the image data IMA from the processing device 300. The interface circuit 110 may be an interface circuit of various image interface systems including an LVDS, a parallel RGB system, and a display port. LVDS is an abbreviation for Low Voltage Differential Signaling.

The storage unit 170 stores attenuation rate distribution information 171 and grid identification information 175. The storage unit 170 is a storage circuit such as a register or a memory. The memory is a volatile memory such as a RAM, or a non-volatile memory such as an OTP memory or an EEPROM. RAM is an abbreviation for Random Access Memory. OTP is an abbreviation for One Time Programmable. EEPROM is an abbreviation for Electrically Erasable Programmable Read Only Memory. The processing device 300 may write the attenuation rate distribution information 171, the grid identification information 175, or both the attenuation rate distribution information 171 and the grid identification information 175 in the storage unit 170 via an interface circuit of an SPI system or an I2C system. Alternatively, when the storage unit 170 is a non-volatile memory, the attenuation rate distribution information 171, the grid identification information 175, or both the attenuation rate distribution information 171 and the grid identification information 175 may be written in the storage unit 170 in advance.

The attenuation rate distribution information 171 indicates an attenuation rate distribution of light reaching the display panel from the light source element. The attenuation rate distribution indicates a relationship between a distance from the light source element to a pixel and an attenuation rate of light with which the light source element illuminates the pixel. The attenuation rate distribution is also referred to as an attenuation characteristic or a luminance distribution. The attenuation rate distribution information 171 is, for example, a lookup table in which the distance is input and from which the attenuation rate is output. Alternatively, the attenuation rate distribution information may be function information that defines a function of the attenuation rate distribution. An argument of the function is a distance, and a return value is an attenuation rate. The function information is, for example, a coefficient used for a function.

The grid identification information 175 is information indicating an effective light source position in the computing grid used by the luminance processing circuit 120. The computing grid is a grid used when the luminance processing circuit 120 determines luminance of each of the light sources of the backlight 210 and computes luminance at which each of the light sources of the backlight 210 illuminates a pixel of the display panel. Light source elements can be arranged at intersections of rows and columns in the computing grid, and each of the intersections is referred to as a light source position. The backlight 210 may not include light source elements corresponding to all of the light source positions in the computing grid. The effective light source position is a light source position corresponding to a light source element of the backlight 210 among the light source positions in the computing grid. In the computing grid, a light source position having no corresponding light source element in the backlight 210 is referred to as a virtual light source position. The grid identification information 175 may be any of information in which the effective light source position is identified, information in which the virtual light source position is identified, and information in which both the effective light source position and the virtual light source position are identified.

Image data IMA is input to the luminance processing circuit 120 from the interface circuit 110. The image data IMA input to the luminance processing circuit 120 is also referred to as input image data. The luminance processing circuit 120 performs dimming processing using the image data IMA, and the attenuation rate distribution information 171 and the grid identification information 175 read from the storage unit 170, thereby determining light source luminance information indicating the light-emission luminance of each of the light source elements and outputting the light source luminance information as light source luminance data LLD. In addition, the luminance processing circuit 120 computes lighting luminance information based on the light source luminance data LLD and the attenuation rate distribution information 171 read from the storage unit 170 and outputs the lighting luminance information as lighting luminance data LPX. The lighting luminance information indicates lighting luminance in each pixel on the display panel 220 when the display panel 220 is illuminated by the backlight 210. The luminance processing circuit 120 computes the light source luminance information and the lighting luminance information on the assumption that the light source element is present at each of the light source positions of the computing grid, but in this case, performs a computation by enabling the effective light source position and disabling the virtual light source position. That is, regardless of the presence or absence of the virtual light source positions, a common algorithm is used as the computation algorithm, the common algorithm assuming that the light source elements are present at the light source positions in the computing grid, and computation corresponding to various arrangements is executed by setting each of the light source positions to be enabled or disabled.

The light source control circuit 130 controls the light source driver 240 based on the light source luminance data LLD. Specifically, the light source control circuit 130 outputs a timing control signal for controlling a light-emitting timing of the light-emitting element or a update timing of the light-emission luminance to the light source driver 240 and outputs the light source luminance data LLD to the light source driver 240, as light source luminance data DDIM. The light source driver 240 drives each of the light-emitting elements with a PWM signal having a pulse width corresponding to the light-emission luminance of each of the light source elements indicated by the light source luminance data DDIM, at a timing defined by the timing control signal. Thus, each of the light-emitting elements emits light with light-emission luminance controlled by the local dimming.

The color correction circuit 160 performs color correction on the image data IMA based on the lighting luminance data LPX and outputs the corrected image data IMB to the display driver 230. Specifically, the color correction circuit 160 multiplies pixel data of each pixel by a reciprocal number of luminance of light reaching the pixel and sets the obtained result as new pixel data.

The light source control circuit 130, the luminance processing circuit 120 and the color correction circuit 160 are logic circuits that process digital signals. Each of the light source control circuit 130, the luminance processing circuit 120, and the color correction circuit 160 may be configured by a separate logic circuit, or some or all of them may be configured by an integrated logic circuit. Alternatively, a processor such as a DSP may execute an instruction set or a program in which functions of the light source control circuit 130, the luminance processing circuit 120, and the color correction circuit 160 are described, thereby implementing the functions of these circuits.

Alternatively, the circuit device 100 may be a processor such as a CPU, a GPU, a microcomputer, a DSP, an ASIC, or an FPGA. Then, the processor may execute an instruction set or a program in which a function of each unit of the circuit device 100 is described, thereby implementing the function of the circuit device 100.

The circuit device 100 may include a distortion correction circuit. The distortion correction circuit corrects image distortion caused by an optical system that projects, onto a screen or the like, an image displayed on the display panel 220, or image distortion caused by distortion of the screen. Specifically, the distortion correction circuit performs image correction for canceling or reducing the image distortion on the image data IMA received by the interface circuit 110 and outputs the corrected image data to the luminance processing circuit 120 and the color correction circuit 160. However, the distortion correction circuit may be provided in the processing device 300 instead of the circuit device 100.

2. Example of Detailed Configuration

Figure 3:
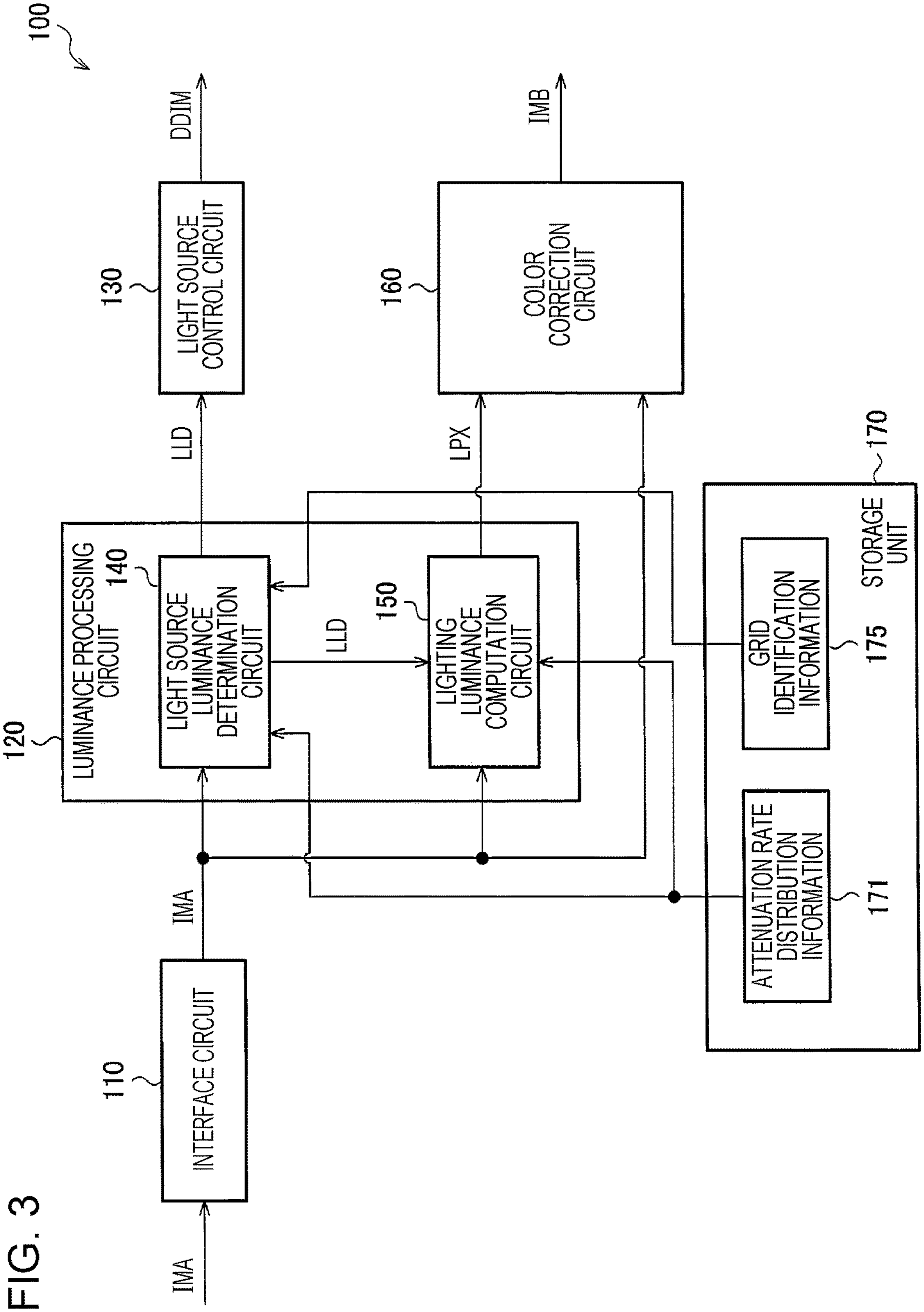
FIG. 3 is a diagram illustrating a first detailed configuration example of the circuit device.

FIG. 3 illustrates a first detailed configuration example of the circuit device. Note that the components similar to those in FIG. 2 will not be described appropriately, and components different from those in FIG. 2 will mainly be described.

The luminance processing circuit 120 includes a light source luminance determination circuit 140 and a lighting luminance computation circuit 150.

The light source luminance determination circuit 140 performs dimming processing using the image data IMA, and the attenuation rate distribution information 171 and the grid identification information 175 read from the storage unit 170, thereby determining light source luminance information indicating the light-emission luminance of each of the light source elements and outputting the light source luminance information as light source luminance data LLD. The dimming processing will be described below with reference to FIG. 11 and the like, but the dimming processing is not limited thereto. For example, the light source luminance determination circuit 140 may generate the light source luminance information by down-sampling the image data IMA to image data in which one pixel corresponds to each of the light source elements.

Figure 4:
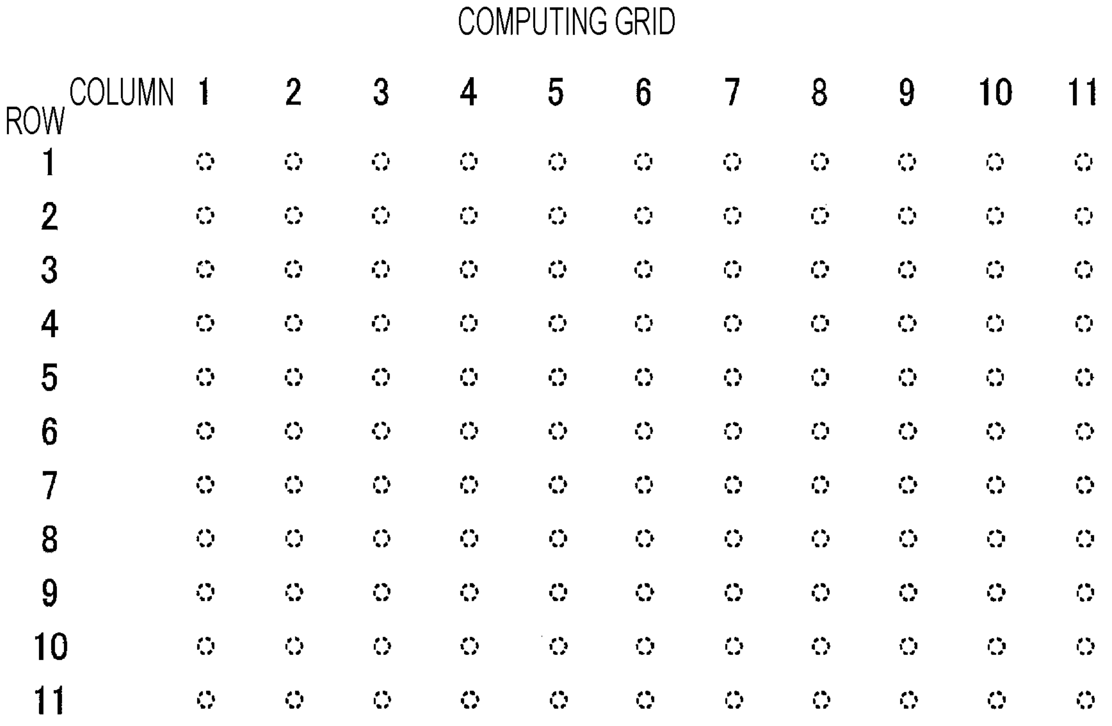
FIG. 4 is a diagram illustrating an example of a computing grid.

The light source luminance determination circuit 140 computes the light source luminance information for each of the light source positions in the computing grid. FIG. 4 illustrates an example of the computing grid. Although a grid of 11 rows and 11 columns is illustrated, the number of rows and the number of columns may be any integer of 2 or more, and the number of rows and the number of columns may be different from each other. Dotted circles indicate light source positions in the computing grid. The computing grid is a grid used for computation, and it is not necessary that light source elements corresponding to all of the light source positions are actually arranged in the backlight 210. In the computing grid, the light source positions in each row are aligned in a horizontal scanning direction of the display panel 220, and the light source positions in each column are aligned in a vertical scanning direction of the display panel 220. The light source positions in each row are equally spaced at a first interval, and the light source positions in each column are equally spaced at a second interval. The first interval and the second interval may be equal to each other or may be different from each other.

Figure 5:
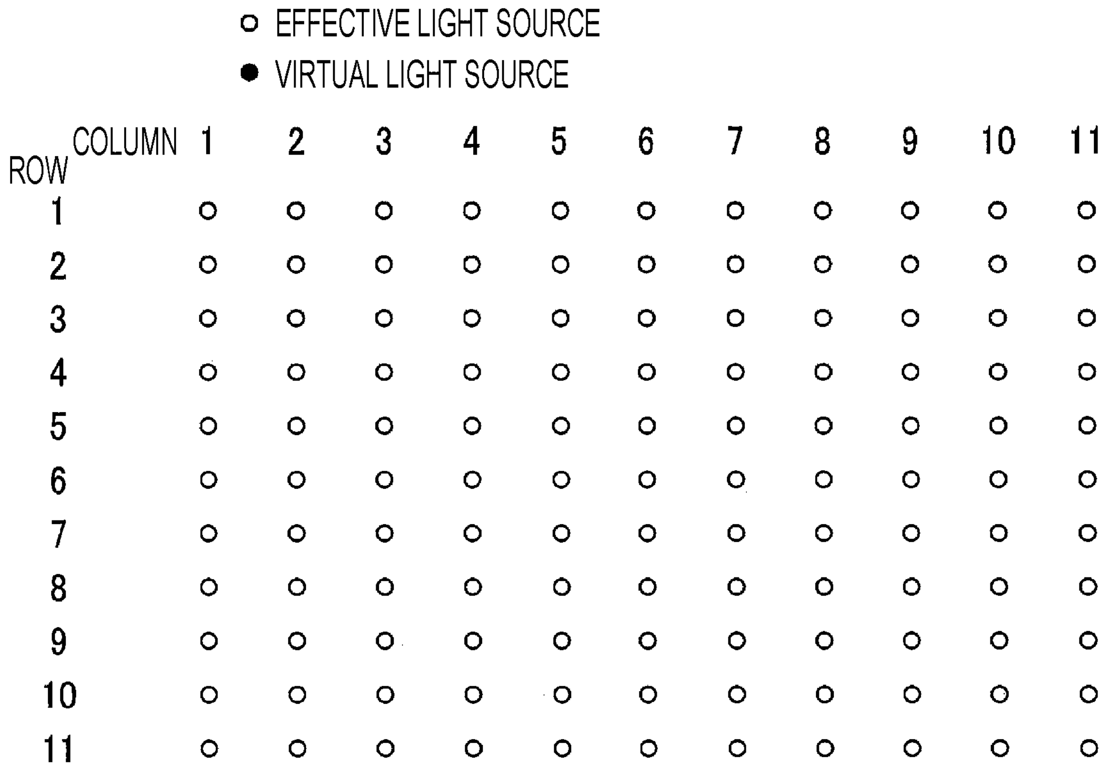
FIG. 5 is a diagram illustrating an example in which all light source positions of the computing grid are effective light source positions.

FIG. 5 illustrates an example in which all light source positions in the computing grid are effective light source positions. White-blank circles indicate effective light source positions, but black-filled circles indicate virtual light source positions. As described above, the effective light source positions are light source positions at which corresponding light source elements are arranged in the backlight 210 in the computing grid. The virtual light source positions are light source positions at which corresponding light source elements are not arranged in the backlight 210 in the computing grid.

Figure 6:
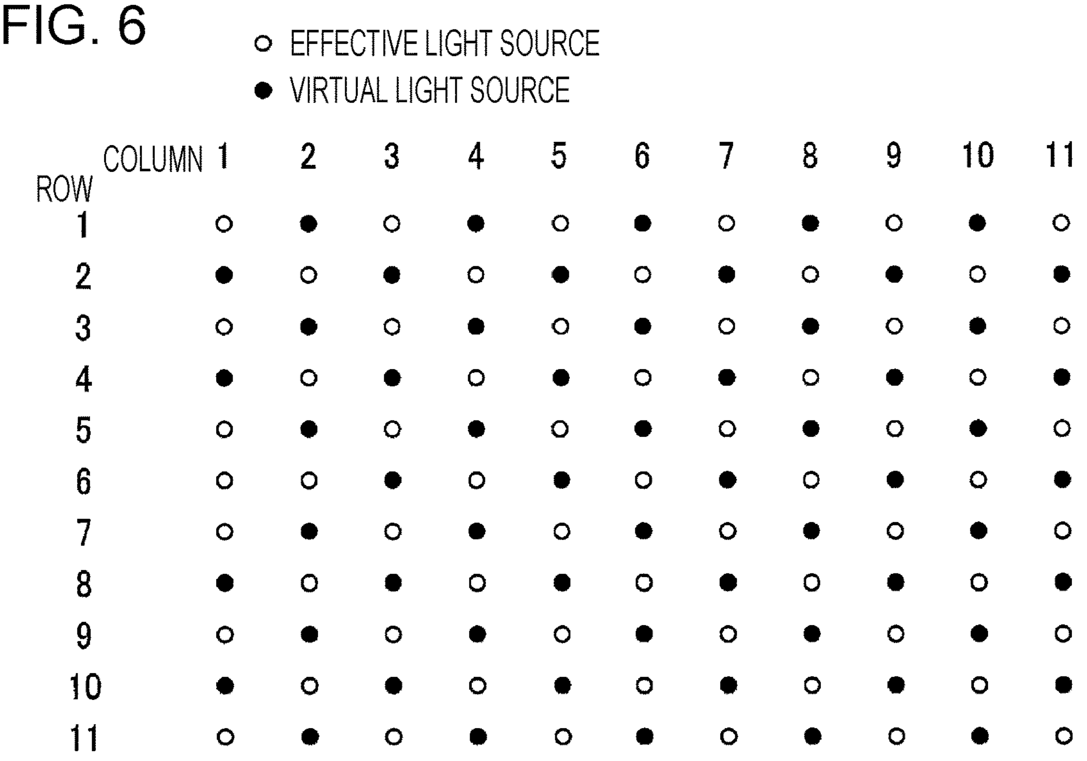
FIG. 6 is a diagram illustrating a first example of a case where some positions of the computing grid are virtual light source positions.

FIG. 6 illustrates a first example in which some positions of the computing grid are virtual light source positions. In the first example, the effective light source positions are in a zigzag arrangement. The zigzag arrangement is an arrangement in which one of an odd-numbered column and an even-numbered column in an even-numbered row is an effective light source position, and the other of the odd-numbered column and the even-numbered column in an odd-numbered row is an effective light source position.

The effective light source positions and the virtual light source positions in the computing grid may be appropriately arranged. For example, the effective light source positions may be arranged in a parallelogram arrangement, a hexagonal arrangement, or the like without being limited to the zigzag arrangement described above.

Figure 7:
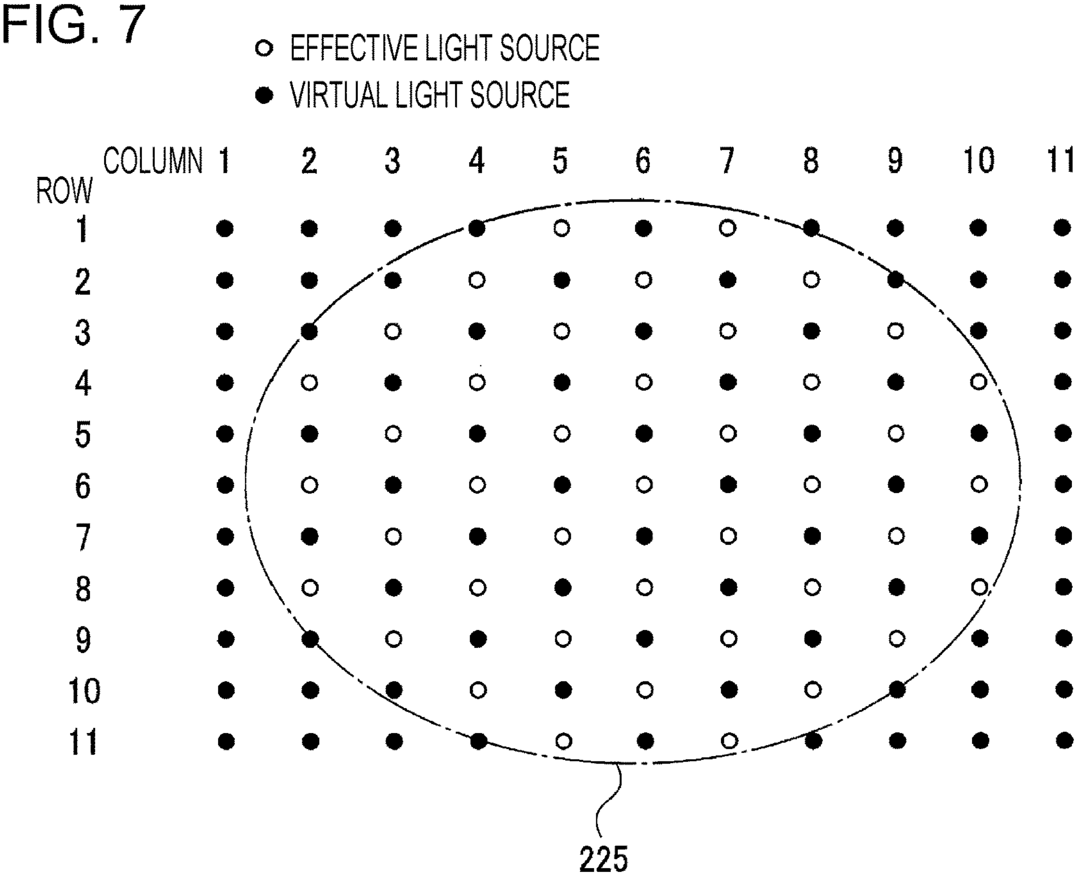
FIG. 7 is a diagram illustrating a second example of a case where some positions of the computing grid are virtual light source positions.

FIG. 7 illustrates a second example in which some positions of the computing grid are virtual light source positions. In the second example, the display panel 220 and the backlight 210 have a non-rectangular outer shape outer shape 225. Here, an example is illustrated in which the outer shape 225 is an ellipse. Effective light source positions are arranged in a zigzag in a region where the computing grid and the outer shape 225 overlap, and light source positions of the computing grid are virtual light source positions, in a region outside the outer shape 225. Even in a partial region inside the outer shape 225, light source positions of the computing grid may be virtual light source positions. For example, when it is clear that a display object is not positioned in the partial region, the light source element may not be actually disposed in the partial region.

Figure 8:
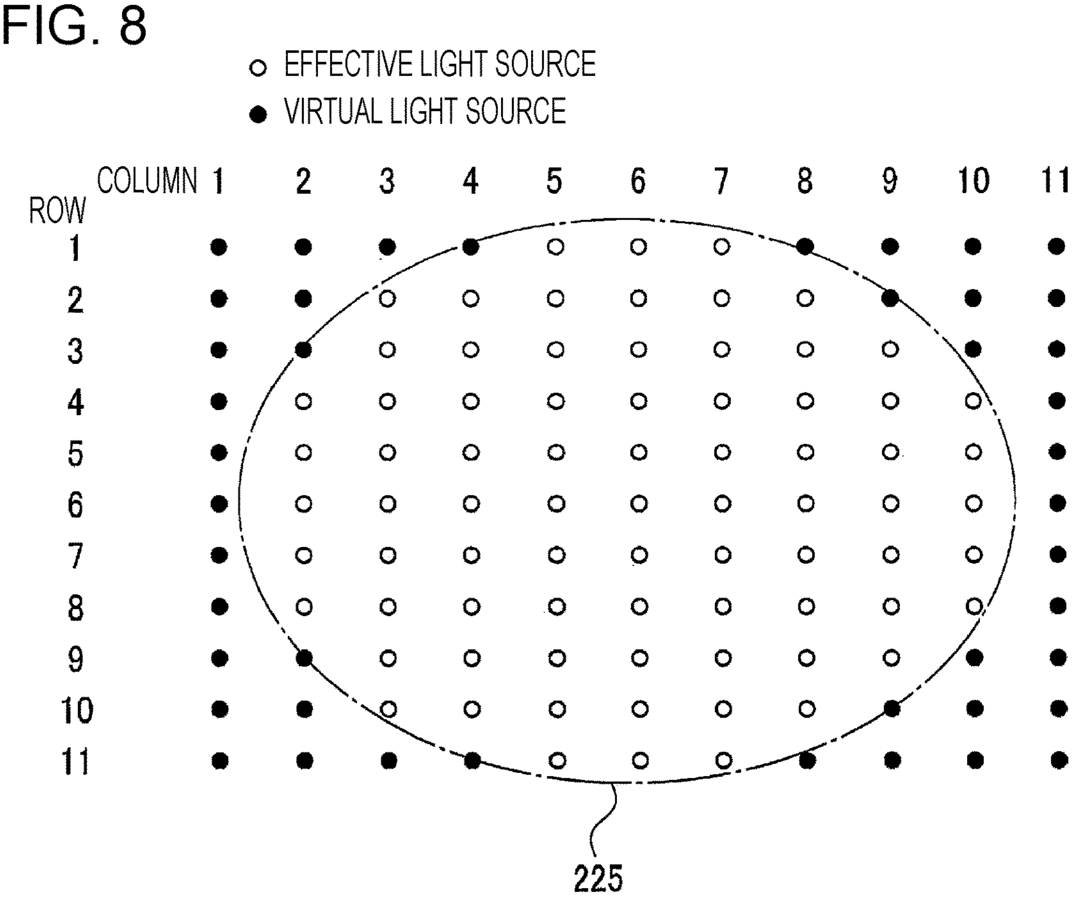
FIG. 8 is a diagram illustrating a third example of a case where some positions of the computing grid are virtual light source positions.

FIG. 8 illustrates a third example in which some positions of the computing grid are virtual light source positions. In the third example, light source position of the computing grid are effective light source positions, in a region where the computing grid and the outer shape 225 overlap, and light source positions of the computing grid are virtual light source positions, in a region outside the outer shape 225.

The computing grid may include three regions: a region only of effective light source positions, a region only of virtual light source positions, and a mixture region of effective light source positions and virtual light source positions.

The light source luminance determination circuit 140 computes light source luminance information by enabling the effective light source position of the computing grid and disabling the virtual light source position of the computing grid and outputs the light source luminance information as light source luminance data LLD. Although all of the light source positions of the computing grid are incorporated into a computation algorithm, the light source luminance determination circuit 140 fixes luminance of the virtual light source position to zero and executes computation according to the computation algorithm.

The lighting luminance computation circuit 150 obtains a distance between each of the light source positions and the pixel of the display panel 220, obtains an attenuation rate corresponding to the distance from the attenuation rate distribution information 171, and obtains lighting luminance of the pixel using the attenuation rate and the light source luminance obtained from the light source luminance data LLD. The lighting luminance computation circuit 150 outputs the obtained lighting luminance information as lighting luminance data LPX.

The lighting luminance computation circuit 150 uses the computing grid in the computation of the lighting luminance information. That is, the lighting luminance computation circuit 150 computes the lighting luminance with which the light source element at each of the light source positions of the computing grid illuminates each pixel of the display panel 220. At this time, in the light source luminance data LLD, the luminance at the effective light source position is the luminance determined by the light source luminance determination circuit 140, and the luminance at the virtual light source position is set to zero. Thus, the effective light source position is enabled and the virtual light source position is disabled even in the computation of the lighting luminance information. Although all of the light source positions of the computing grid are incorporated into the computation algorithm, since the luminance at the virtual light source position is zero, the luminance at the virtual light source position does not affect the lighting luminance even when the lighting luminance computation circuit 150 executes the computation according to the computation algorithm.

Various forms of the grid identification information 175 are assumed. For example, the grid identification information 175 is information identified whether each of the light source positions in the computing grid is an effective light source position or a virtual light source position. Alternatively, the grid identification information 175 may be information in which only the effective light source position is identified in the computing grid. In this case, the light source position, which is not the effective light source position, is identified as the virtual light source position. Alternatively, the grid identification information 175 may be information in which only the virtual light source position is identified in the computing grid. In this case, the light source position, which is not the virtual light source position, is identified as the effective light source position.

Figure 9:
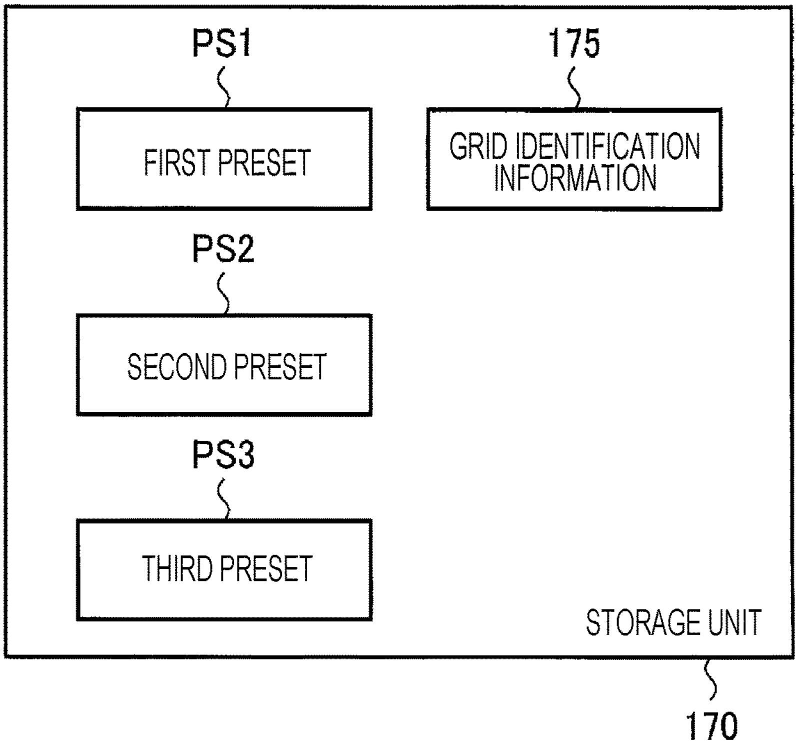
FIG. 9 is a diagram illustrating an example of grid identification information designating presets.

Alternatively, the grid identification information 175 may be information for designating a preset. An example is illustrated in FIG. 9. The storage unit 170 stores first preset PS1 to third preset PS3 and the grid identification information 175. The preset may be written in the storage unit 170 from the processing device 300 via an interface circuit (not illustrated). When the storage unit 170 is a non-volatile memory, the preset may be written in the non-volatile memory in advance. Each of the first preset PS1 to the third preset PS3 is information for identifying the effective light source positions in the computing grid, and the effective light source positions in the computing grid are different from each other. Alternatively, each of the first preset PS1 to the third preset PS3 is information for identifying the virtual light source positions in the computing grid, and the virtual light source positions in the computing grid are different from each other. Alternatively, each of the first preset PS1 to the third preset PS3 is information for identifying both the effective light source positions and the virtual light source positions in the computing grid, and the effective light source positions and the virtual light source positions in the computing grid are different from each other. The grid identification information 175 is information for designating any one of the first preset PS1 to the third preset PS3.

Figure 10:
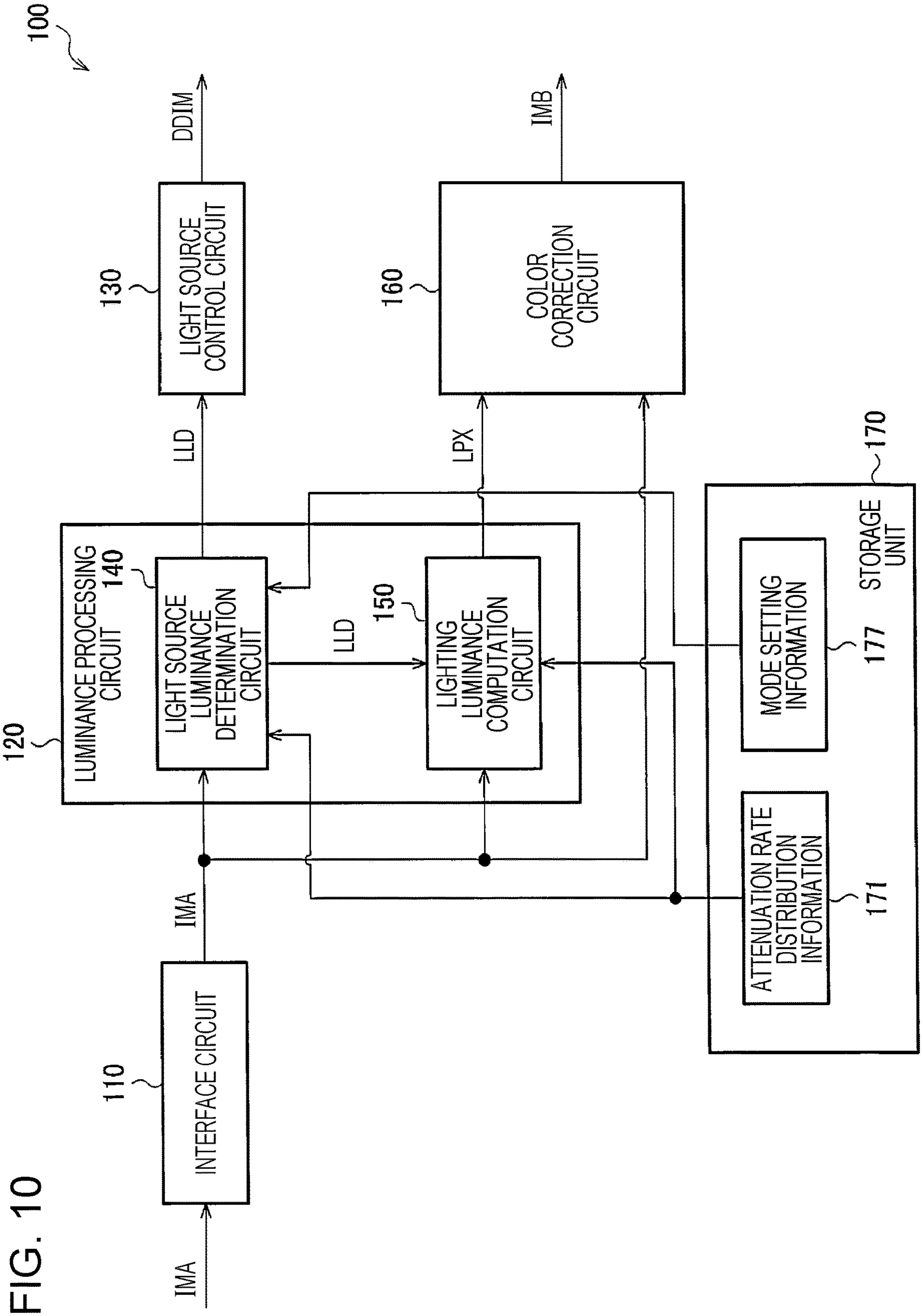
FIG. 10 is a diagram illustrating a second detailed configuration example of the circuit device.

Although an example has been described above in which the effective light source positions and the like are identified by the grid identification information 175, the effective light source positions and the like may also be identified by mode switching according to the region. FIG. 10 illustrates a second detailed configuration example of the circuit device. Note that the components similar to those in FIG. 2 or 3 will not be described appropriately, and components different from those in FIG. 2 or 3 will mainly be described.

The storage unit 170 stores the attenuation rate distribution information 171 and mode setting information 177. The mode setting information 177 may be written in the storage unit 170 from the processing device 300 via an interface circuit (not illustrated). Alternatively, when the storage unit 170 is a non-volatile memory, the mode setting information 177 may be written in the non-volatile memory in advance.

The mode setting information 177 is information for setting a mode in each region of the computing grid. The light source luminance determination circuit 140 identifies effective light source positions and virtual light source positions in the region in the computing grid according to the mode setting information 177. Examples of the modes include an effective light source mode in which all light source positions in the region are effective light source positions, a virtual light source mode in which all light source positions in the region are virtual light source positions, and a mixed mode in which effective light source positions and virtual light source positions are mixed in the region. At least two of these modes may be required.

Referring to FIG. 7 as an example, the mode setting information 177 is information for setting the mixed mode for the region where the computing grid and the outer shape 225 of the display panel 220 or the like overlap, and setting the virtual light source mode for the region outside the outer shape 225. Referring to FIG. 8 as an example, the mode setting information 177 is information for setting the effective light source mode for the region where the computing grid and the outer shape 225 overlap, and setting the virtual light source mode for the region outside the outer shape 225.

The mode setting is not limited to the examples described above, and any mode of the above three modes may be set for each of a plurality of regions. Further, the computing grid may be divided into three regions, and the effective light source mode, the virtual light source mode, and the mixed mode may be set for each of the three regions.

In the present embodiment, the circuit device 100 controls the display device 200 including the plurality of light source elements and the display panel 220. The circuit device 100 includes the luminance processing circuit 120 and the color correction circuit 160. The luminance processing circuit 120 computes the lighting luminance information indicating the luminance at which a target pixel of the display panel 220 is illuminated by the plurality of light source elements, based on the light source luminance information indicating the luminance of light emitted by each of the plurality of light source elements and the attenuation rate distribution information 171 indicating the attenuation rate distribution of the light with respect to the distance between the light source element and the pixel. The color correction circuit 160 performs the color correction on the input image data IMA based on the lighting luminance information. The luminance processing circuit 120 computes the lighting luminance information by disabling the light source luminance information of the virtual light source positions where the plurality of light source elements are not arranged in the computing grid used for the computation of the lighting luminance information.

According to the present embodiment, it is possible to execute the local dimming processing when the light source element is disposed at any light source position in the computing grid, using the local dimming processing algorithm when the light source elements are arranged at all of the light source positions in the computing grid. Thus, the degree of freedom in arrangement of the light source elements in the backlight 210 can be increased, and a common local dimming processing algorithm can be used for the arrangement with a high degree of freedom.

Figure 12:
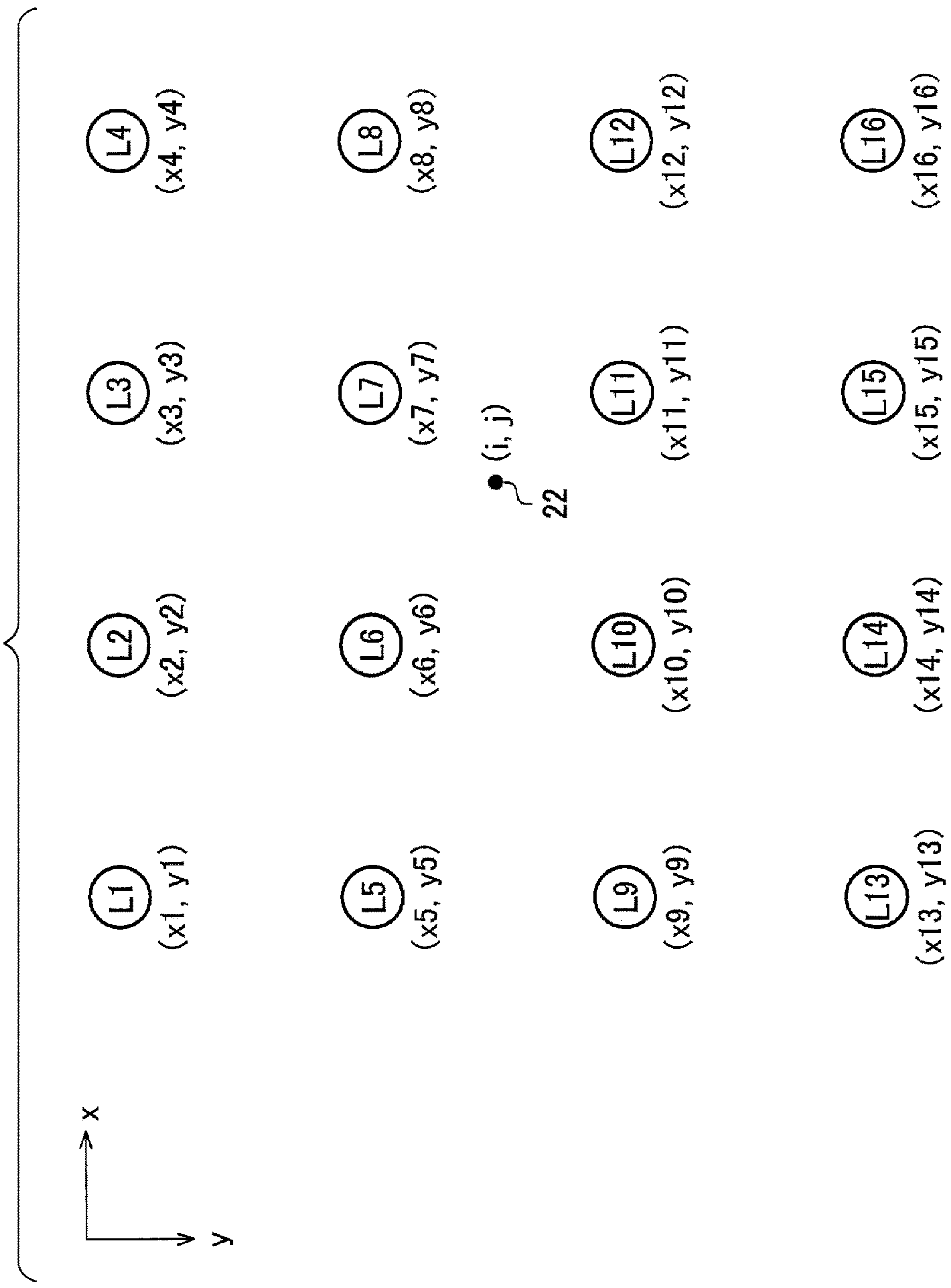
FIG. 12 is a diagram illustrating an example of light source elements arranged at surrounding light source positions.

Further, according to the present embodiment, it is possible to reduce a load when the lighting luminance information is computed using the attenuation rate distribution information 171. As illustrated in FIG. 12 to be described below, the lighting luminance computation circuit 150 selects light source elements L1 to L16 arranged at s×t light source positions around a target pixel 22. Here, it is assumed that s=t=4 and the light source elements are arranged at all of the light source positions in the computing grid. During the computation of the luminance of the light reaching the target pixel 22 from the light source element Lk, the lighting luminance computation circuit 150 calculates a distance between the light source element Lk and the target pixel 22 and acquires the attenuation rate corresponding to the distance from the attenuation rate distribution information 171, where k is indicated by 1, 2, . . . , and 16. Since the light source positions in the computing grid are regularly arranged, the distances between the light source elements L1 to L16 and the target pixel 22 also appear regularly. The target pixel 22 moves by one pixel at a time in an x-direction, which is the horizontal scanning direction. Regions surrounded by the nearest four LEDs have the same regularity. By utilizing the fact described above, the computation load can be reduced. For example, when the attenuation rate distribution information 171 is a lookup table, the attenuation rate corresponding to the distance is obtained by interpolation of the lookup table based on the distance between the light source element Lk and the target pixel 22. In view of the regularity described above, when the above-described interpolation processing is performed once on the region surrounded by the nearest four LEDs, it can be used repeatedly. In order to cope with the light source arrangement of the backlight 210 having no regularity, it is necessary to calculate the distance for every pixel because of being incapable of using the regularity as described, but according to the present embodiment, it is possible to reduce the computation load as described above using the regular computing grid. Even when some positions of the computing grid are the virtual light source positions, the light source luminance of the virtual light source position is simply zero, and the regularity of the computing grid can still be used.

Further, according to the present embodiment, in a case of determining the light source luminance or in a case of computing the lighting luminance, it is easy to determine which light source element should be a target. The computation of the lighting luminance is taken as an example, the determination of the light source luminance is similar. As illustrated in FIG. 12 to be described below, the lighting luminance computation circuit 150 selects the light source elements L1 to L16 arranged at the s×t light source positions around the target pixel 22. Here, it is assumed that s=t=4. The light source elements are arranged in the entire computing grid in FIG. 12, but part of the computing grid may be virtual light source positions. When the lighting luminance computation circuit 150 selects the light source elements around the target pixel 22, it is necessary to determine which light source element should be selected, but the selection becomes easy regardless of the existence of the virtual light source positions, using a regular computing grid. For example, s×t surrounding light source positions that form a rectangle may be selected in the computing grid, and s and t may be determined such that a predetermined number of effective light source positions are included in the rectangle formed by s×t light source positions.

In the present embodiment, the circuit device 100 may include the storage unit 170 that stores the grid identification information 175. The grid identification information 175 identifies at least one of the effective light source positions, at which the plurality of light source elements are arranged, and the virtual light source positions in the computing grid. The luminance processing circuit 120 may disable the light source luminance information of the virtual light source position based on the grid identification information 175.

According to the present embodiment, the luminance processing circuit 120 can identify the effective light source position and the virtual light source position in the computing grid, based on the grid identification information 175 stored in the storage unit 170. In addition, for example, the processing device 300 or other device writes the grid identification information 175 in the storage unit 170, and thus it is possible to set the grid identification information 175 according to the light source arrangement of the backlight 210.

In the present embodiment, the storage unit 170 may store the grid identification information 175 in which the effective light source position or the virtual light source position is identified for each of the light source positions in the computing grid.

According to the present embodiment, the grid identification information 175 identifies, for each of the light source positions in the computing grid, whether the light source position is an effective light source position or a virtual light source position. By using such grid identification information 175, the luminance processing circuit 120 can identify the effective light source position and the virtual light source position in the computing grid.

In the present embodiment, the storage unit 170 may store the grid identification information 175 for designating any one preset from the plurality of presets. In the plurality of presets, the effective light source position or the virtual light source position is identified in advance for each of the light source positions in the computing grid.

According to the present embodiment, the preset is designated by the grid identification information 175, and the designated preset identifies, for each of the light source positions in the computing grid, whether the light source position is an effective light source position or a virtual light source position. By using such grid identification information 175, the luminance processing circuit 120 can identify the effective light source position and the virtual light source position in the computing grid.

In the present embodiment, the luminance processing circuit 120 may include at least two modes of the effective light source mode, the virtual light source mode, and the mixed mode. The effective light source mode is a mode in which the light source positions in the computing grid are set to the effective light source positions at which the plurality of light source elements are arranged. The virtual light source mode is a mode in which the light source positions in the computing grid are set to the virtual light source positions. The mixed mode is a mode in which the effective light source positions and the virtual light source positions are mixed in the computing grid.

According to the present embodiment, when the mode is selected, the luminance processing circuit 120 can identify the effective light source position and the virtual light source position in the computing grid.

In the present embodiment, the luminance processing circuit 120 may set a first mode, which is one of at least two modes, for the first region in the computing grid. The luminance processing circuit 120 may set a second mode, which is different from the first mode, of at least two modes for the second region different from the first region in the computing grid.

According to the present embodiment, the luminance processing circuit 120 can identify the effective light source position and the virtual light source position in each of the regions by setting the mode for each of the regions in the computing grid. Further, different modes are set for the regions, and thus it is possible to cope with a case where various arrangements of the light source elements are mixed. Thus, the degree of freedom in arrangement of the light source elements in the backlight 210 can be increased, and a common local dimming processing algorithm can be used for the arrangement with a high degree of freedom.

In the present embodiment, the computing grid may be a grid in which light source positions are aligned at the first interval in the horizontal scanning direction and light source positions are aligned at the second interval in the vertical scanning direction.

As described above, the first interval and the second interval may be equal to each other or may be different from each other. It is desirable that the light source elements can be freely arranged in the backlight 210, but it is troublesome to prepare a dedicated local dimming processing algorithm for each arrangement. According to the present embodiment, the virtual light source position is disabled in the equally spaced computing grid to compute the lighting luminance information, and thus the common local dimming processing algorithm can be used for the arrangement with a high degree of freedom.

In the present embodiment, one of the odd-numbered column and the even-numbered column in the odd-numbered row and the other of the odd-numbered column and the even-numbered column in the even-numbered row may be the virtual light source position in the computing grid.

According to the present embodiment, it is possible to realize the backlight 210 having a so-called zigzag arrangement. In the computing grid, the light source position corresponding to the light source element having the zigzag arrangement is an effective light source position, and the light source position having no corresponding light source element is a virtual light source position. Even in the zigzag arrangement, the local dimming processing algorithm using the computing grid can be used.

In the present embodiment, the luminance processing circuit 120 includes the light source luminance determination circuit 140 and the lighting luminance computation circuit 150. The light source luminance determination circuit 140 may disable the light source luminance information of the virtual light source position in the computing grid and determine the light source luminance information based on the input image data IMA. The lighting luminance computation circuit 150 may compute the lighting luminance information based on the light source luminance information determined by the light source luminance determination circuit 140 and the attenuation rate distribution information 171.

According to the present embodiment, when the light source luminance determination circuit 140 disables the light source luminance information of the virtual light source position, the virtual light source position is also disabled in the computation of the lighting luminance information. Thus, the luminance processing circuit 120 can compute the lighting luminance information by disabling the light source luminance information of the virtual light source position in the computing grid.

Further, as will be described below, the luminance processing circuit 120 may compute the lighting luminance information by using the light source luminance information of the s×t light source positions around the target pixel in the computing grid, where each of s and t is an integer of 2 or more.

According to the present embodiment, the light source elements to be considered in the computation of the lighting luminance information are limited to the light source elements arranged at s×t light source positions around the target pixel. Thus, the computation load of the lighting luminance information can be reduced.

Figure 11:
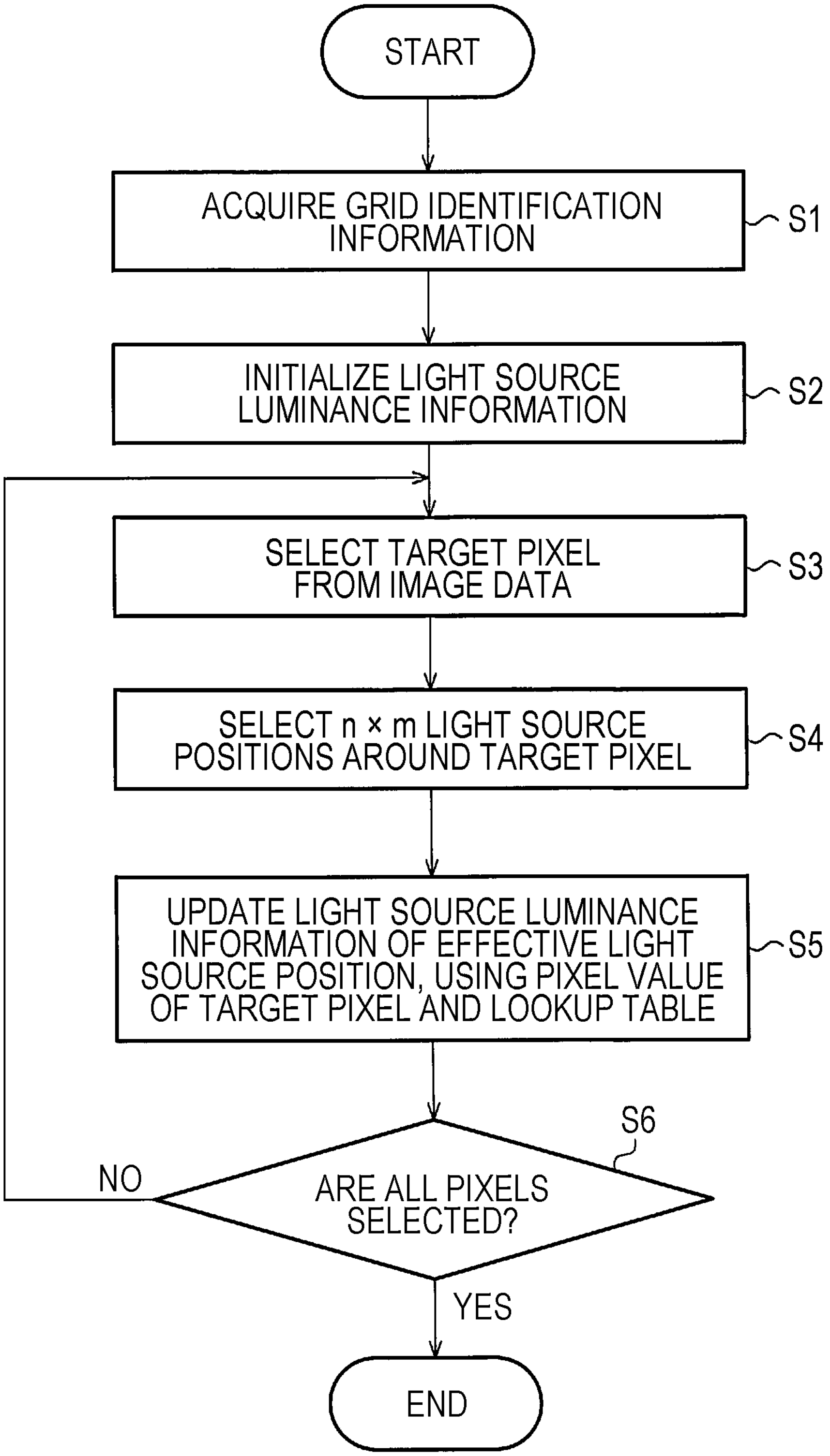
FIG. 11 is a flowchart of processing performed by a light source luminance determination circuit.

3. Light Source Luminance Determination Circuit and Lighting Luminance Computation Circuit FIG. 11 is a flowchart of processing performed by the light source luminance determination circuit. In step S1, the light source luminance determination circuit 140 reads the grid identification information 175 from the storage unit 170 and identifies the effective light source position and the virtual light source position in the computing grid.

In step S2, the light source luminance determination circuit 140 initializes light source luminance information. For example, the luminance values of all the light source elements are initialized to zero.

In step S3, the light source luminance determination circuit 140 selects one pixel from the pixels included in the image data IMA. The selected pixel is referred to as a target pixel. Through a loop from step S3 to step S6, target pixels are sequentially selected. For example, a process is performed in which a first pixel of a first scanning line of the image data IMA is selected in the first round of step S3, a second pixel, a third pixel, and the like are sequentially selected in the next and following rounds of step S3, and pixels of a second scanning line are sequentially selected when all the pixels of the first scanning line are selected, and such a process is repeated up to a final scanning line.

In step S4, the light source luminance determination circuit 140 selects n×m light source positions around the target pixel in the computing grid. The n×m light source positions are also referred to as surrounding light source positions, where each of n and m may be an integer of 2 or more. FIG. 12 illustrates an example of the light source elements arranged at the surrounding light source positions. Here, an example of n=m=4 is shown. Although the light source elements are not actually arranged at the virtual light source positions, virtual light source elements are assumed here for the purpose of computation.

As illustrated in FIG. 12, a position of the target pixel 22 is set to (i, j), where i and j are integers, and the position (i, j) indicates an i-th pixel of a j-th scanning line. The light source luminance determination circuit 140 selects light source elements L1 to L16 arranged at the light source positions in the nearest two columns in each of a +x-direction and a −x-direction and in the nearest two rows in each of the +y-direction and the −y-direction based on the position (i, j). When k is an integer of 1 or more and 16 or less, a position of a light source element Lk is represented by (xk, yk).

In step S5 of FIG. 12, the light source luminance determination circuit 140 updates the light source luminance information for each of the light source elements at the n×m light source positions selected in step S4, using the pixel value of the target pixel 22 in the image data IMA and the attenuation rate distribution information 171 stored in the storage unit 170. At this time, the light source luminance determination circuit 140 updates the light source luminance information of the effective light source position, and does not update the light source luminance information of the virtual light source position by fixing it to the initial value.

In step S6, the light source luminance determination circuit 140 determines whether all of the pixels have been selected as the target pixels, the process ends when all of the pixels have been selected, and the process returns to step S3 when there is any pixel that has not been selected.

A description will be made with respect to update processing of the light source luminance information in step S5. The light source luminance determination circuit 140 determines, from Formula (1) below, a required variation amount $\Delta_{ij}$ indicating a variation amount required for the amount of light received by the target pixel 22 from the light source elements L1 to L16.

$$\Delta_{ij} = INT_{ij} = \sum_{k=1}^{16} lsf(k) \times powc(k) \tag{1}$$

In Formula (1) above, $INT_{ij}$ indicates the luminance value of the target pixel 22 in the image data IMA. The luminance value is the maximum value out of the RGB pixel values of the target pixel 22 in the image data IMA. Alternatively, the luminance value may be a luminance value, for example, Y in a YCrCb space calculated by multiplying the RGB pixel value of the target pixel 22 in the image data IMA by a coefficient. Where, lsf(k) indicates an attenuation rate of the light with which the light source element Lk illuminates the target pixel 22. The light source luminance determination circuit 140 determines the distance between the target pixel 22 and the light source element Lk, and determines an attenuation rate lsf(k) corresponding to the determined distance from the attenuation rate distribution information 171. Where, powc(k) indicates previous light source luminance information of the light source element Lk. The previous light source luminance information is light source luminance information calculated using a previous target pixel selected immediately before the current target pixel 22. The previous target pixel is a pixel at a position (i−1, j) immediately before the position (i, j) in the x-direction. The light source luminance information powc(k) of the light source element corresponding to the virtual light source position is fixed to an initial value.

The light source luminance determination circuit 140 updates the light source luminance information by distributing the required variation amount $\Delta_{ij}$ to the light source luminance information of the light source element Lk using Formula (2) below.

$$powu(k) = \begin{cases} powc(k) + \Delta_{ij}\dfrac{lsk(k)}{\sum_{\alpha=1}^{16} lsf(\alpha)}, & \text{if } \Delta_{ij} > 0 \\ powc(k), & \text{if } \Delta_{ij} \le 0 \end{cases} \tag{2}$$

In Formula (2) above, powu(k) indicates the current light source luminance information, that is, the light source luminance information after being updated. The light source luminance information powu(k) of the light source element corresponding to the virtual light source position is fixed to the initial value and is not updated. That is, in the light source luminance information which is finally determined, the luminance of the light source element corresponding to the virtual light source position remains at the initial value.

Figure 13:
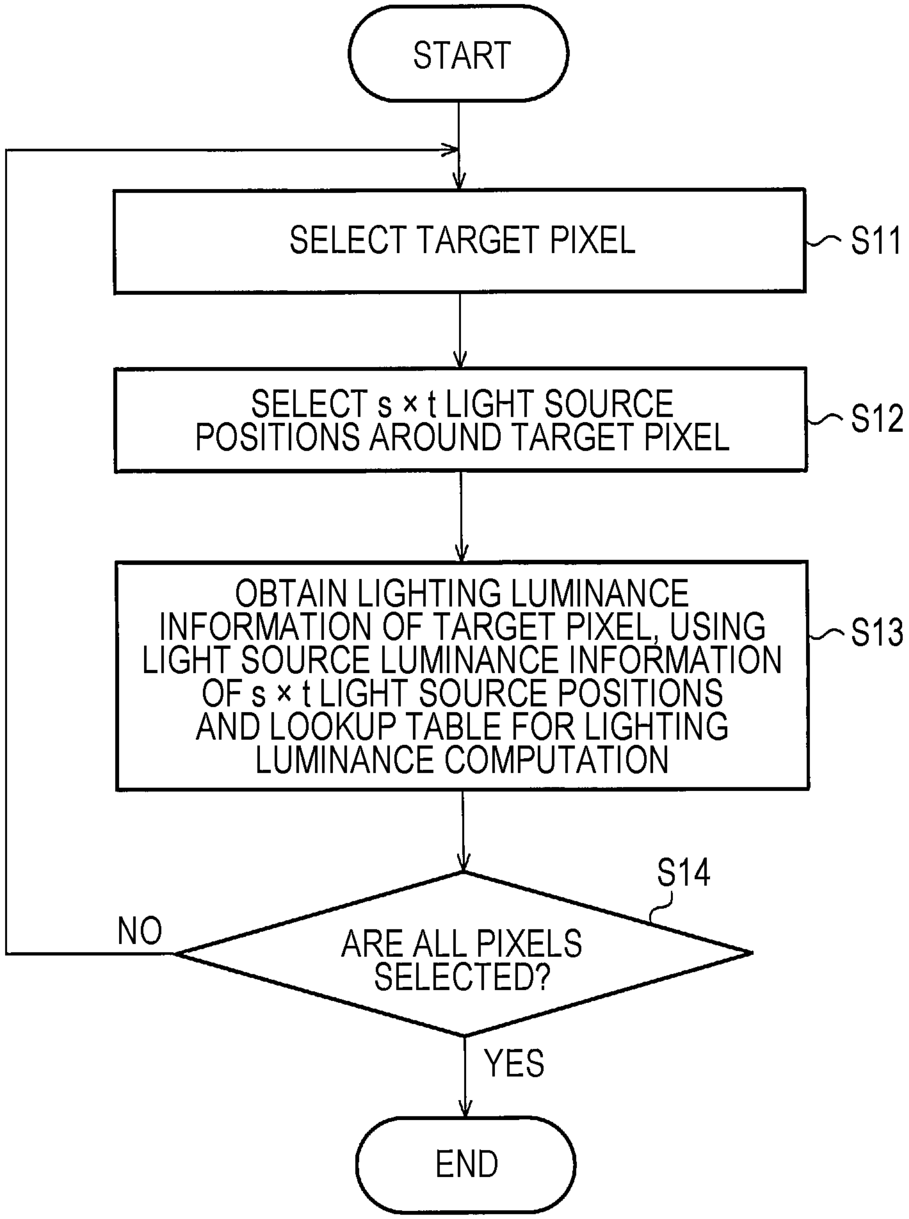
FIG. 13 is a flowchart of processing performed by a lighting luminance computation circuit.

FIG. 13 is a flowchart of processing performed by the lighting luminance computation circuit. Although the example of the surrounding light source position in FIG. 12 is also used herein, the processing performed by the lighting luminance computation circuit 150 is separated from the processing performed by the light source luminance determination circuit 140.

In step S11, the lighting luminance computation circuit 150 selects one pixel from the pixels in the image data IMA. The selected pixel is referred to as a target pixel. Through a loop from step S11 to step S14, target pixels are sequentially selected. For example, a process is performed in which a first pixel of a first scanning line of the image data IMA is selected in the first round of step S11, a second pixel, a third pixel, and the like are sequentially selected in the next and following rounds of step S11, and pixels of a second scanning line are sequentially selected when all the pixels of the first scanning line are selected, and such a process is repeated up to a final scanning line.

In step S12, the lighting luminance computation circuit 150 selects s×t light source positions around the target pixel in the computing grid. The s×t light source positions are also referred to as surrounding light source positions, where each of s and t may be an integer of 2 or more, and FIG. 12 illustrates an example of s=t=4. However, the s×t and the n×m may be different. Although the light source elements are not actually arranged at the virtual light source positions, virtual light source elements are assumed here for the purpose of computation.

The lighting luminance computation circuit 150 selects light source elements L1 to L16 arranged at the light source positions in the nearest two columns in each of the +x-direction and the −x-direction and in the nearest two rows in each of the +y-direction and the −y-direction based on the position (i, j). When β is an integer of 1 or more and 16 or less, a position of a light source element Lβ is represented by (xβ, yβ).

In step S13, the lighting luminance computation circuit 150 obtains the lighting luminance information of the target pixel, using the light source luminance information of the light source elements at the selected s×t light source positions and the attenuation rate distribution information 171.

In step S14, the lighting luminance computation circuit 150 determines whether all of the pixels have been selected as the target pixels, the process ends when all of the pixels have been selected, and the process returns to step S11 when there is any pixel that has not been selected.

A description will be made with respect to computation processing of the lighting luminance information in step S13. The lighting luminance computation circuit 150 obtains the lighting luminance information of the target pixel 22 by using Formulas (3) and (4) below.

$$PL(i, j) = \sum_{\beta=1}^{s\times t} pow(\beta) \times lsf(\beta) \tag{3}$$

$$lsf(\beta) = lsf\left((i - x\beta)^2 + (j - y\beta)^2\right) \tag{4}$$

In Formula (3) above, PL(i, j) indicates the lighting luminance information for the pixel at the position (i, j), pow(β) indicates the light source luminance information determined by the light source luminance determination circuit 140, and lsf(β) indicates an attenuation rate of light with which a light source element Lβ illuminates the target pixel 22. The lighting luminance computation circuit 150 obtains a distance between the target pixel 22 and the light source element Lβ, and obtains an attenuation rate lsf(β) corresponding to the distance from the attenuation rate distribution information 171. In Formula (4) above, a square of a distance is used as an input to the lookup table, but the distance may be used as an input to the lookup table.

After the loop of steps S3 to S6 in the flow of FIG. 11 is executed up to the last pixel in the image data IMA, the powu in Formula (2) above is used as pow in Formula (3) above. Even when the loop of steps S3 to S5 is not executed up to the last pixel in the image data IMA, the updating of the light source luminance information of the light source elements sequentially ends as the target pixel advances, and thus the light source luminance information for which the updating ends may be used as pow.

The lighting luminance computation circuit 150 may obtain the lighting luminance information of the target pixel not only from the light source luminance information of the s×t light source elements around the target pixel but also from the light source luminance information of all the light source elements of the backlight 210.

Although the present embodiment has been described in detail above, it will be easily understood by those skilled in the art that various modifications can be made without substantially departing from the novel matters and effects of the present disclosure. Therefore, all such modifications are included in the scope of the present disclosure. For example, the terms described together with different terms having a broader meaning or the same meaning at least once in the specification or the drawings can be replaced with the different terms in any part in the specification or the drawings. Further, all combinations of the present embodiment and the modifications may be within the scope of the present disclosure. In addition, the configurations, operations, and the like of the circuit device, the backlight, the display panel, the display device, the display system, the processing device, the electronic apparatus, and the like are not limited to those described in the present embodiment, and various modifications can be made.

What is claimed is:

1. A circuit device that controls a display device including a plurality of light source elements and a display panel, the circuit device comprising:

a luminance processing circuit that computes lighting luminance information indicating luminance at which a target pixel of the display panel is illuminated by the plurality of light source elements, based on light source luminance information indicating luminance of light emitted by each of the plurality of light source elements and attenuation rate distribution information indicating an attenuation rate distribution of light with respect to a distance between each of the light source elements and each of pixels; and a color correction circuit that performs color correction on input image data, based on the lighting luminance information, wherein the luminance processing circuit computes the lighting luminance information by disabling the light source luminance information of virtual light source positions where the plurality of light source elements are not arranged in a computing grid used for computation of the lighting luminance information.

2. The circuit device according to claim 1, further comprising a storage unit that stores grid identification information for identifying at least one of effective light source positions, at which the plurality of light source elements are arranged, and the virtual light source positions in the computing grid, wherein the luminance processing circuit disables the light source luminance information of the virtual light source positions, based on the grid identification information.

3. The circuit device according to claim 2, wherein the storage unit stores the grid identification information in which the effective light source positions or the virtual light source positions are identified for light source positions in the computing grid.

4. The circuit device according to claim 2, wherein the storage unit stores the grid identification information for designating any one preset from a plurality of presets in which the effective light source positions or the virtual light source positions are identified in advance for light source positions in the computing grid.

5. The circuit device according to claim 1, wherein the luminance processing circuit includes at least two modes of:

an effective light source mode in which light source positions in the computing grid are set to effective light source positions at which the plurality of light source elements are arranged;

a virtual light source mode in which the light source positions in the computing grid are set to the virtual light source positions; and a mixed mode in which the effective light source positions and the virtual light source positions are mixed in the computing grid.

6. The circuit device according to claim 5, wherein the luminance processing circuit sets a first mode, which is one of the at least two modes, for a first region in the computing grid, and sets a second mode, which is different from the first mode, of the at least two modes for a second region different from the first region in the computing grid.

7. The circuit device according to claim 1, wherein the computing grid is a grid in which light source positions are aligned at a first interval in a horizontal scanning direction and light source positions are aligned at a second interval in a vertical scanning direction.

8. The circuit device according to claim 7, wherein one of an odd-numbered column and an even-numbered column in an odd-numbered row and an other of an odd-numbered column and an even-numbered column in an even-numbered row are the virtual light source positions in the computing grid.

9. The circuit device according to claim 1, wherein the luminance processing circuit includes:

a light source luminance determination circuit that disables the light source luminance information of the virtual light source positions in the computing grid and determines the light source luminance information, based on the input image data; and a lighting luminance computation circuit that computes the lighting luminance information, based on the light source luminance information, which is determined by the light source luminance determination circuit, and the attenuation rate distribution information.

10. The circuit device according to claim 1, wherein the luminance processing circuit computes the lighting luminance information by using the light source luminance information of $s \times t$ light source positions around the target pixel in the computing grid, each of s and t being an integer of 2 or more.

11. A display system comprising:

the circuit device according to claim 1; and the display device.

* * * * *